Oct. 13, 1931.  J. W. McCOY  1,827,249
ELECTRIC CONDUIT COUPLING
Filed Aug. 17, 1929
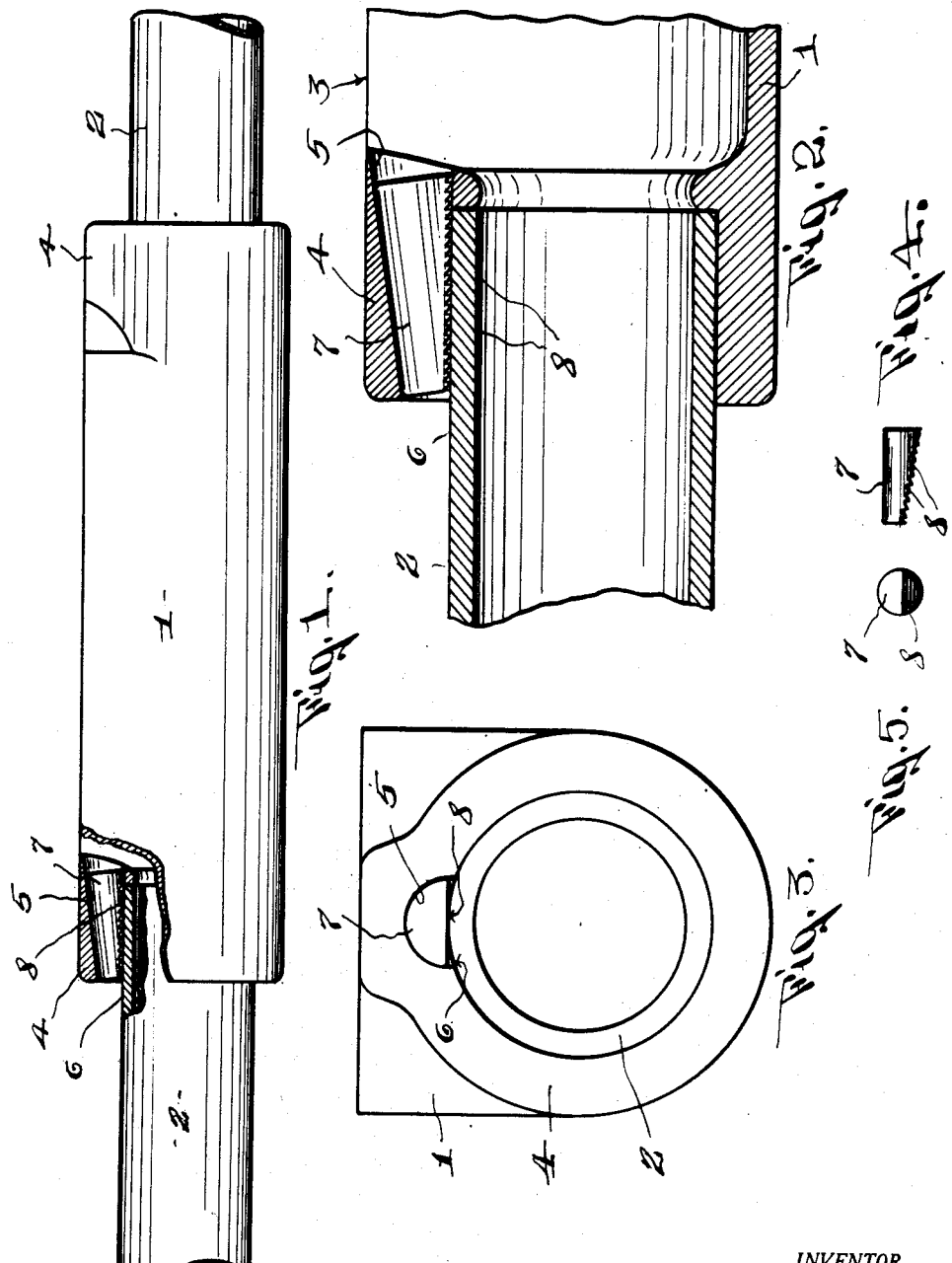

Patented Oct. 13, 1931

1,827,249

UNITED STATES PATENT OFFICE

JAY W. McCOY, OF SYRACUSE, NEW YORK, ASSIGNOR TO CROUSE-HINDS COMPANY, OF SYRACUSE, NEW YORK, A CORPORATION OF NEW YORK

ELECTRIC CONDUIT COUPLING

Application filed August 17, 1929. Serial No. 386,685.

This invention relates to conduit couplings and has for its object a particularly simple and efficient means for coupling two conduit sections, particularly electric conduit sections, together whereby the sections can not be unintentionally separated.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of a plurality of conduit sections coupled together and embodying my invention.

Figure 2 is an enlarged fragmentary sectional view of parts seen in Figure 1.

Figure 3 is an end elevation of parts seen in Figure 2.

Figures 4 and 5 are respectively a side elevation and an end view of the wedge of the coupling means.

This invention comprises, generally, two conduit sections, one being provided with a bore for receiving the end portion of the other, the section provided with the bore being formed with a wedge passage extending lengthwise of the bore at one side thereof and opening along one side through the wall of the bore and a wedge in the passage and having a face for gripping the end portion of the conduit therein and preventing relative endwise displacement of the sections, the wedge passage and the wedge being so arranged relatively to the conduits that force applied to the conduits tending to separate them causes the wedge to grip tighter on the inner conduit.

1 and 2 designate, generally, the conduit sections, the section 1 being an outlet box open at one side 3, the outlet box being provided with one or more nipples as 4. The nipples here shown are at the end of the box, although it will be understood that the nipples may be provided in the lateral sides or the bottom of the box and are oftentimes so located.

The section 2 is an electric conduit or pipe which extends into the bore of the nipple 4. The opening 3 is covered by a suitable closure as will be understood by those skilled in the art.

5 designates the wedge passage extending lengthwise of the bore of the nipple, and it is here shown as extending parallel to the bore of the nipple as distinguished from transversely or in an inclined position between a lengthwise and a transverse position. The passage 5 opens at its larger end into the interior of the box and tapers from its inner end towards its outer end and opens at 6 along one side through the wall of the bore of the nipple 4. As the passage 5 tapers, the wall thereof opposite the opening 6 is inclined relatively to the pipe 2 or the axis thereof. Preferably, the passage 5 is arc-shaped in cross section, as seen in Figure 3.

7 designates the wedge which fits the tapered passage 5 and the inner side of the wedge, that is, the side at the opening 6, is formed with a face or serrated face 8 for coacting with the periphery of the pipe to hold the pipe 2 and the box 1 from relative endwise movement. Said face is shown as formed with receding teeth.

Owing to the arrangement of the wedge, any force tending to separate the sections causes the wedge to grip tighter. Hence, the pipe 2, when suspended is capable of sustaining considerable weight. Also, manipulation of the pipe 2 by turning it as when the workmen is assembling a conduit system will not loosen the pipe 2 from the box 1. When the cover is applied to the open side of the box 2, the wedge 7 also is covered, or in other words, access to the wedge is obtained only by removing the cover.

In assembling the conduit sections together, the pipe 2 is placed in the bore of the nipple 4 and the wedge 7 driven in position from the inner side of the box.

This coupling is particularly advantageous in that the conduit sections can be very quickly and securely coupled and the conduits cannot be removed or loosened inadvertently. Also, the pipe is capable of sustaining all the weight it may be called upon to support when the conduit carries a suspended fixture as a lamp or the like.

It will also be noted that when the wedge 7 has been driven into engagement with the conduit 2, that turning movement in either direction relative to the box 1 is prevented because of the flat surface 8 on the wedge. This feature is important as the conduit must not only be held secured against endwise movement, but must also be held from turning movement while the workman is working on the conduit line.

What I claim is:

1. The combination of two conduit sections, one having a bore for receiving the other, the section provided with the bore being also formed with a passage extending in a direction lengthwise of the bore and opening through the wall of the bore and a wedge member slidably movable endwise into said passage and coacting with the other section where the passage opens through the wall of the bore.

2. The combination of two conduit sections, one having a bore for receiving the other, the section provided with the bore being also formed with a passage extending in a direction lengthwise of the bore and opening through the wall of the bore and a wedge movable endwise into said passage and coacting with the other section where the passage opens through the wall of the bore, the wedge being provided with receding teeth with respect to the separating movement of the sections, said teeth engaging the periphery of the section located in the bore.

3. The combination of two conduit sections, one being provided with a bore for receiving the end portion of the other section, the section provided with the bore being formed with a passage extending in a direction lengthwise of the bore and tapering toward the outer end of the bore, said passage opening at one side through the wall of the bore and a wedge located in said passage and having a flat serrated face for coacting with the end portion of the section in the bore where the passage opens through the wall of the bore.

4. The combination of two conduit sections, one being provided with a bore for receiving the end of the other section, the section provided with the bore being formed with a tapered passage extending in a direction lengthwise of the bore, said passage opening at one side through the wall of the bore, and a wedge located in said passage and having an engaging face tangent to the section in the bore and coacting with the end of the section in the bore where the passage opens through the wall of the bore, the wall of the passage opposite the open side of the passage being inclined relatively to the wall of the bore and the wedge conforming to the passage.

5. The combination of two conduit sections, one being provided with a bore for receiving the end of the other section, the section provided with the bore being formed with a tapered passage extending in a direction lengthwise of the bore, said passage opening at one side through the wall of the bore, and a wedge located in said passage and having an engaging face tangent to the section in the bore and coacting with the end of the section in the bore where the passage opens through the wall of the bore, the wall of the passage opposite the open side of the passage being inclined relatively to the wall of the bore and the wedge conforming to the passage, the engaging face being serrated.

6. The combination of two conduit sections, one being provided with a bore for receiving the end portion of the other section and with a passage extending lengthwise of the bore and opening along one side thereinto, said passage being tapered and arranged with its smaller end toward the outer end of the bore and a wedge complemental to the passage and having a flat serrated face for coacting with the end portion of the section in the bore where the wedge passage opens through the wall of the bore for holding the section extending into the bore, from lengthwise and rotatable movement relative to the other section.

7. The combination of two conduit sections, one being a box open at one side and provided with a nipple in a side thereof other than the open side, the nipple having a bore opening into the interior of the box, and the other section being a pipe having its end portion extending into the nipple, the box being formed with a tapering wedge passage extending in a direction lengthwise of the nipple and opening at its larger end into the interior of the box, said passage opening through the inner wall of the bore of the nipple and a wedge located in said passage and removable and replaceable from the wedge passage through the open side of the box, the wedge having a flat serrated face for coacting with the pipe to grip the same where the wedge passage opens into the nipple.

8. The combination of two conduit sections, one having a bore for receiving the end portion of the other, the section formed with the bore being formed with a passage extending lengthwise of the bore and opening at one side into the bore, said passage being arc-shaped in cross section and tapering toward the outer end of the bore and a wedge member complemental to and slidably movable in said passage and having a serrated face for coacting with the section extending into the bore where the passage opens into the bore for preventing outward and rotatable relative movement of the sections.

In testimony whereof, I have hereunto signed my name, at Syracuse, in the county of Onondaga, and State of New York, this 15th day of August, 1929.

JAY W. McCOY.